United States Patent [19]

Klaue

[11] 4,054,189

[45] Oct. 18, 1977

[54] FULLY LINED HYDRAULICALLY ACTUATED DISC BRAKES

[76] Inventor: Hermann Klaue, Tour d'Ivoire 24 e, 1820 Montreux, Switzerland

[21] Appl. No.: 634,896

[22] Filed: Nov. 24, 1975

Related U.S. Application Data

[63] Continuation of Ser. No. 415,681, Nov. 14, 1973, abandoned, which is a continuation-in-part of Ser. No. 288,287, Sept. 12, 1972, Pat. No. 3,885,650, which is a continuation-in-part of Ser. No. 73,566, Sept. 18, 1970, abandoned.

[30] Foreign Application Priority Data

| Dec. 2, 1969 | Germany | 1960286 |
| Dec. 27, 1969 | Germany | 1965171 |
| Dec. 27, 1969 | Germany | 1965170 |
| Nov. 17, 1972 | Sweden | 16741/72 |

[51] Int. Cl.² ............................................. F16D 55/04
[52] U.S. Cl. .................................. 188/71.4; 188/72.6; 188/73.6; 188/106 F; 188/366; 192/70; 192/85 AB
[58] Field of Search .................. 188/71.4, 71.3, 73.6, 188/72.4, 106 F, 72.6, 366; 192/70, 70.13, 85 AB

[56] References Cited

U.S. PATENT DOCUMENTS

| 2,595,859 | 5/1952 | Lambert et al. | 188/71.3 |
| 2,831,552 | 4/1958 | Kershner | 188/71.4 |
| 2,883,007 | 4/1959 | Klaue | 188/71.3 |
| 3,421,601 | 1/1969 | Klaue | 188/71.3 |
| 3,425,518 | 2/1969 | Morrow | 188/366 |

FOREIGN PATENT DOCUMENTS 1,014,857  8/1957  Germany .......................... 188/71.4

Primary Examiner—George E. A. Halvosa
Attorney, Agent, or Firm—Stevens, Davis, Miller & Mosher

[57] ABSTRACT

A hydraulically actuated fully lined disc brake assembly for braking a wheel of a motor vehicle has a brake housing which is provided with a gap which is open on its radially exterior side. Brake discs which fully line the brake housing are disposed in the gap and are supported on a removable bracket which is fixed against rotation. The brake discs are fixed against rotation with the wheel but are free to move axially. A hydraulic actuating mechanism is disposed in the gap between the brake discs and is designed to apply pressure against the discs at their radial center point to actuate the brake discs at their most efficient radii. The brake housing is supported on the wheel and can be removed for replacement of the brake discs after the wheel has been removed without disassembly of the brake actuating mechanism.

13 Claims, 10 Drawing Figures

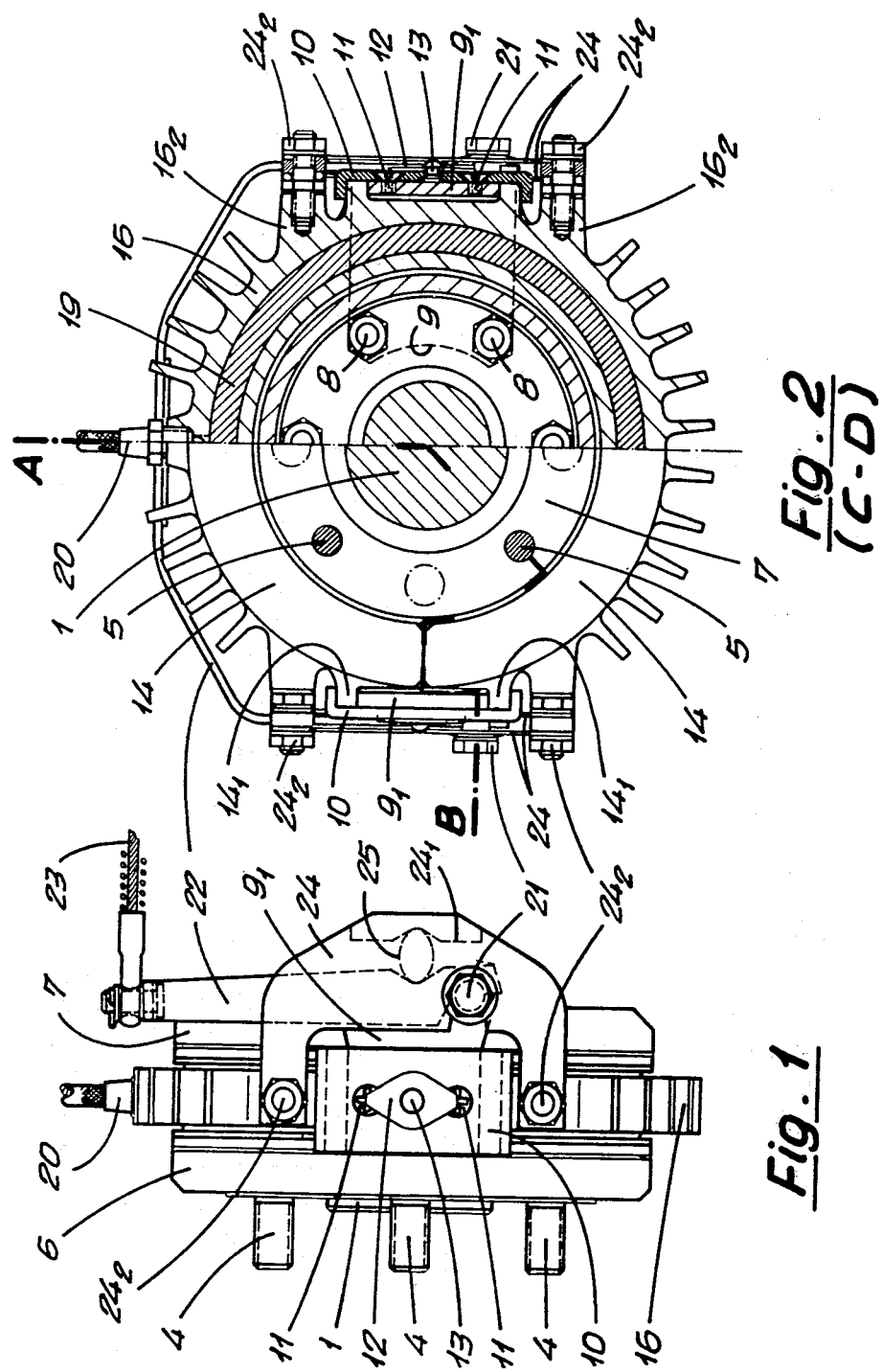

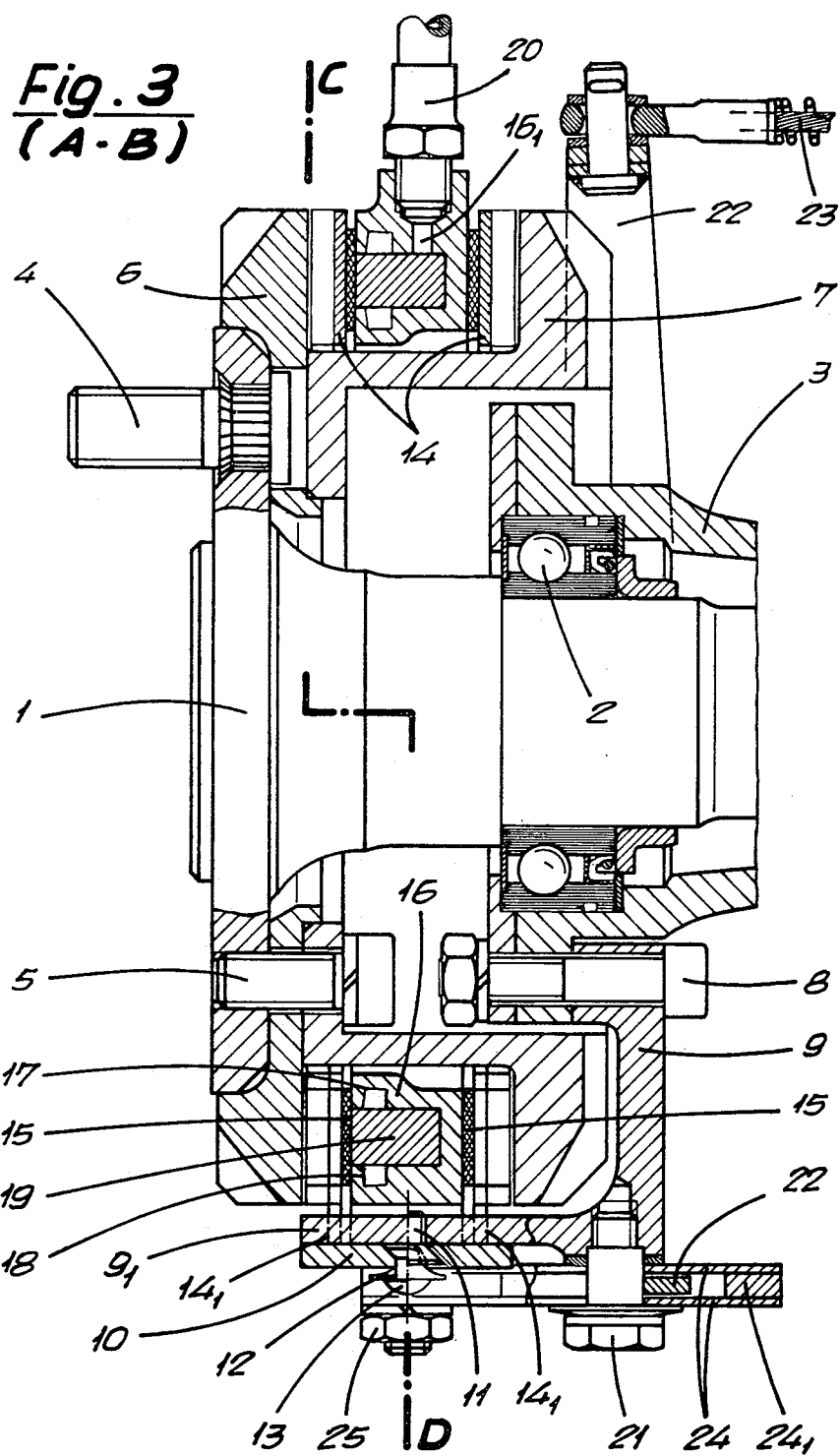

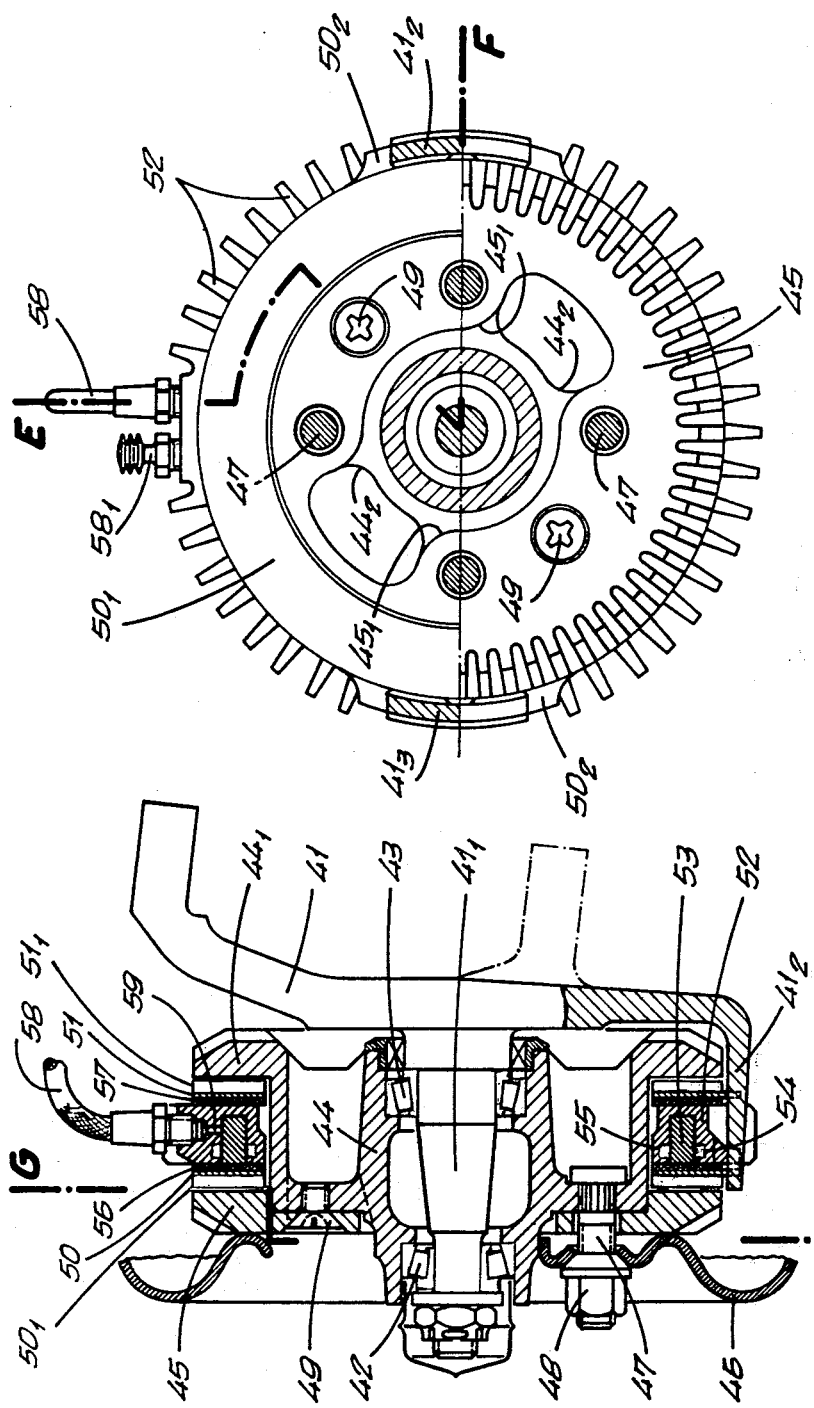

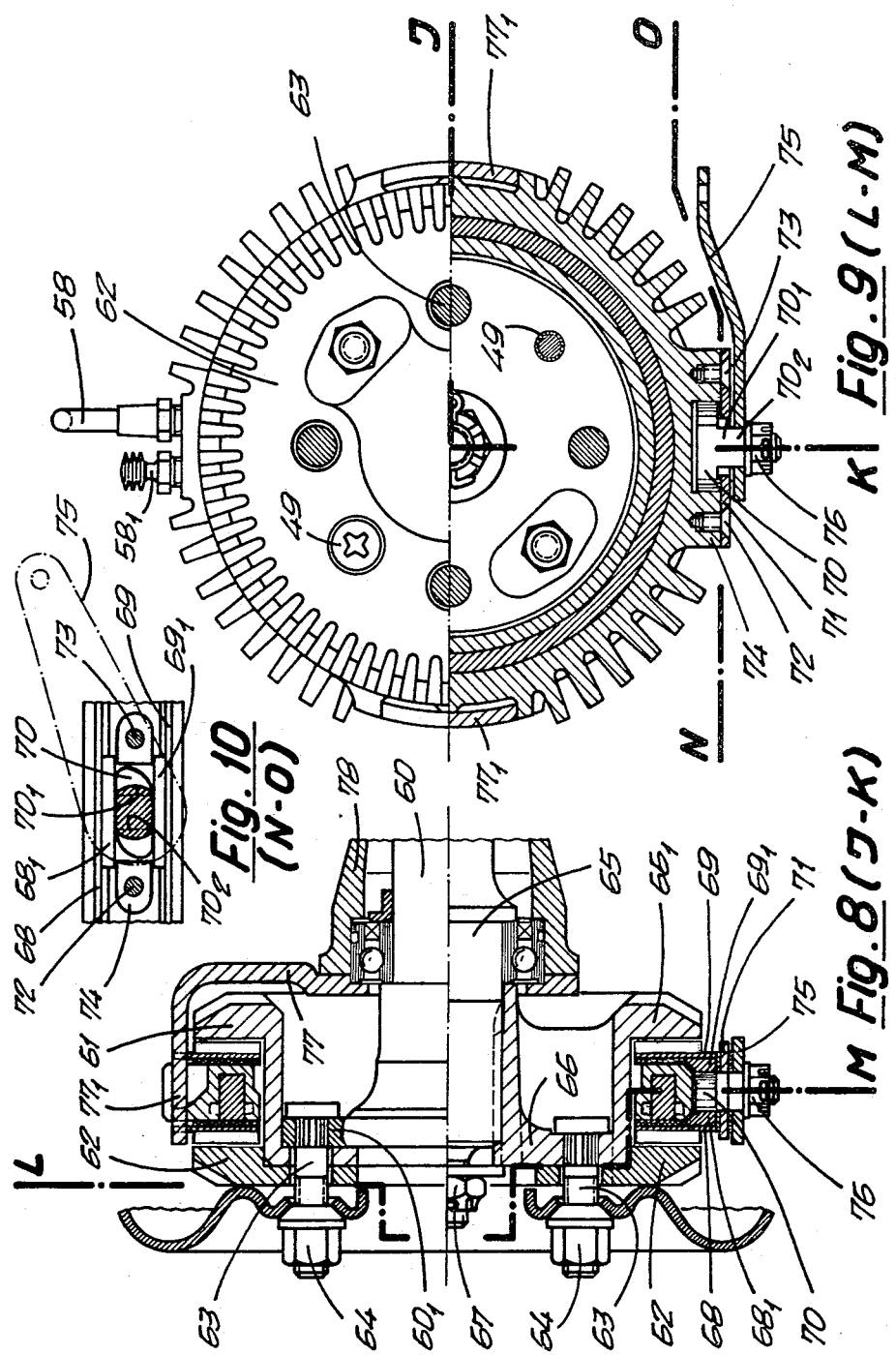

FULLY LINED HYDRAULICALLY ACTUATED DISC BRAKES

This is a continuation of application Ser. No. 415,681 filed Nov. 14, 1973, now abandoned, which is a continuation-in-part of application Ser. No. 288,287 filed Sept. 12, 1972, now U.S. Pat. No. 3,885,650 issued May 27, 1975, which is a continuation-in-part of application Ser. No. 73,566 filed Sept. 18, 1970, now abandoned.

This invention relates generally to brakes for a motor vehicle and more particularly to hydraulically actuated fully lined disc brakes.

Disc brakes in which the brake drum is fully lined and the brake shoe discs are peripherally fixed but axially movable for braking are known. The brake shoes provided with suitable friction linings are disposed in a revolving brake drum of two parts which is externally sealed. A hydraulic ring cylinder and ring piston assembly is provided for actuating the brake linings. Fully lined disc brakes having interchangeable disc segments in a revolving internally sealed brake drum are also known. Annular mechanical actuators are provided between the disc segments. An annular differential cylinder actuation means is provided outside the brake housing for hydraulic actuation of the brake shoes in the internally sealed brake drums.

An object of this invention is to provide a fully lined disc brake having an internally sealed brake housing and a means for the hydraulic actuation thereof which is substantially free from back-lash and which is designed to permit replacement of worn brake linings without disassembling the actuation mechanism.

Other objects will become apparent from the following explanation with reference to the accompanying drawing wherein FIG. 1 is a side elevation of one embodiment of a brake assembly for a rear wheel of a motor vehicle;

FIG. 2 is a front elevation of the embodiment of FIG. 1, partially broken away along the line C-D of FIG. 3;

FIG. 3 is a section taken along the line A-B of FIG. 2;

FIG. 6 is a section along the line E-F of FIG. 5 of an embodiment of a rear brake adapted to be used on a truck;

FIG. 7 is a front elevation of the embodiment of FIG. 6 broken away along the line G-H of FIG. 6;

FIG. 8 is a section taken along the line J-K of FIG. 9;

FIG. 9 is a front elevation broken away along the line L-M of FIG. 8; and

FIG. 10 is a fragmentary section taken along the line N-O of FIG. 9.

Figure 4:
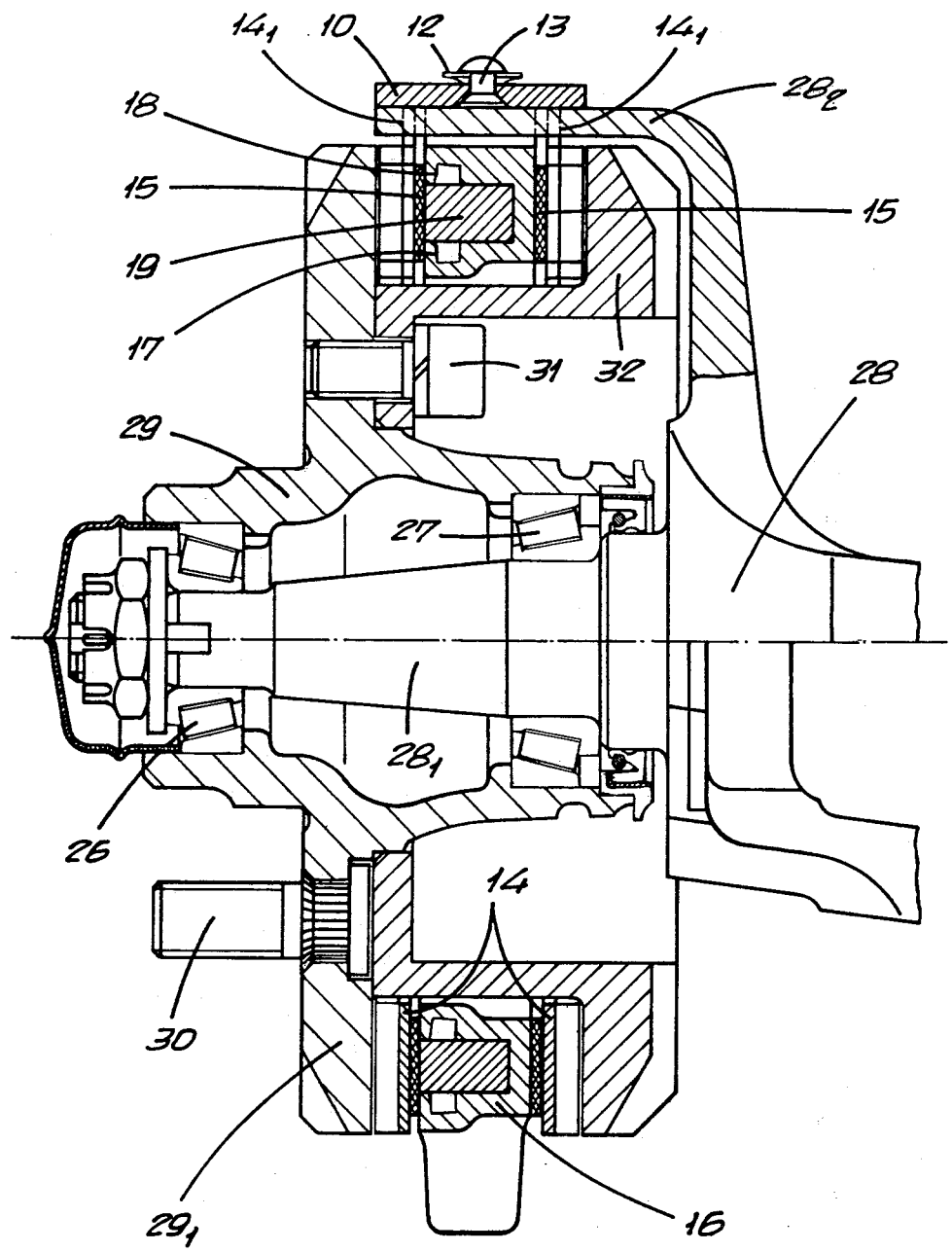
FIG. 4 is a section of a brake assembly similar to that of FIGS. 1 to 3 adapted for a front wheel of a motor vehicle.

The foregoing objects and others are accomplished in accordance with this invention, generally speaking, by providing a disc brake assembly combining a. a rotary, multi-part brake housing which is radially outwardly open;

b. brake supports having stationary arms externally encompassing the brake housing and supporting the actuation unit and adsorbing torque;

c. two one-piece or multi-part brake discs fixed in the tangential direction but freely movable axially and bearing the friction linings, supported by the brake holder arms;

d. activation units mounted between the brake discs and supported by the brake supporting brackets in such a manner as to be axially movable and having ring cylinders and ring pistons or two differential pistons, the axial hydraulic forces developed by the actuation units moving the friction linings of the brake shoes against the surfaces of the brake housing.

The brake discs or disc segments supporting the friction linings may be interchanged without dismantling the actuation unit, in conformity with a further development of the invention, whereby either the wheel-side part of the housing connected to the axle-side part of the housing by means of both the wheel bolts and fastening bolts may be removed following wheel removal and loosening of the fastening bolts;

or the semi-circular brake discs may rest on the stationary brake holder arms by means of radial projections and are surrounded by detachable yokes connected to the brake holder arms.

In a still further embodiment of the invention, the hydraulically actuated fully lined disc brake may be mechanically acted on by applying a mechanical rod system to the brake disc of one side by means of lever transmission. In a still further embodiment, the additional mechanical actuation may take place by a cam rotatably mounted between the two brake discs at the outer periphery of the hydraulic actuation unit.

Referring now to FIGS. 1 through 4, the drive shaft of a rear axle and brake assembly is referenced as 1. The drive shaft 1 is mounted on roller bearings 2 in axle 3. A flange on drive shaft 1 carries wheel bolts 4. Studs 5 secure a brake cover 6 and brake drum 7 to the flange. Two brake support brackets 9 are fastened by studs 8 to axle 3 with arms $9_1$ extending over brake housing 7. Each arm $9_1$ is provided with a guard member 10 which may be removed by loosening slot bolts 11 which are secured by a strip spring 12 riveted to member 10 by rivet 13. Brake shoe segments 14 are disposed in the space between brake drum 7 and brake cover 6 with friction linings facing the inner surfaces of cover 6 and drum 7. Brake shoes 14 are composed of two semi-circular segments. Radial projections $14_1$ of brake shoe segments 14 are seated between arms $9_1$ and member 10 to secure the brake shoes 14 against peripheral motion but shoes 14 are free to move axially. Member 10 may be removed to expose brake shoes 14 which may then be replaced without opening the brake housing 7 and without disassembly of the brake shoe actuation apparatus.

A hydraulic brake shoe actuation unit has an annular or ring cylinder 16 and an annular or ring piston 19 axially connected by insulating discs 15 to brake shoes 14. Ring piston 19 may move axially within ring cylinder 16 and is sealed by means of seals 17 and 18, square in cross-section, which simultaneously provide for continuous adjustment. When the brake is hydraulically actuated, brake fluid is supplied to ring cylinder 16 through hose 20 and bore $16_1$. Hose 20 and cylinder 16 are axially supported by arms $9_1$. In response to fluid pressure in cylinder 16, ring piston 19 presses disc 15 and one brake shoe 14 against revolving brake cover 6 while ring cylinder 16 presses a disc 15 and the other brake shoe 14 against revolving housing 7. The frictional linings of the shoes 14 are thus moved into contact with the surfaces of cover 6 and housing 7 to exert a braking action. As shown in FIG. 3, ring piston 19 presses brake shoe 14 through disc 15 at the radial center of brake shoe 14 when the brake shoe is actuated against the braking surface. Likewise, ring cylinder 16 presses through disc 15, the radial center of braking disc 14 as the latter is moved towards the braking surface.

A yoke 22 for mechanical actuation of the rear brake by a cable 23 is pivotally secured by bolt 21 to bracket 9.

A cable 23 fixed to clevis or yoke 22 is provided for mechanical actuation of the rear brake. Yoke 22 is pivotally secured to arm $9_1$ of bracket 9 by stud 21. Two plates form a clevis or yoke 24 disposed on each side of yoke 22 and secured by studs $24_2$ to extension $16_2$ of cylinder 16. Yoke 24 has integral pressure plates $24_1$ having a generally triangularly shaped notch in an edge thereof. A similar notch is provided in an arm of yoke 22 and an elliptically shaped pin 25 is disposed in the notches. When cable 23 is pulled by the hand brake lever, yoke 22 held by studs 22 on brake bracket 9 presses against pressure plates $24_1$ through pin 25, elliptical in cross-section. The brake shoes 14 are thereby pressed against the inner surface of brake drum 7 and the brake is actuated.

Figure 5:
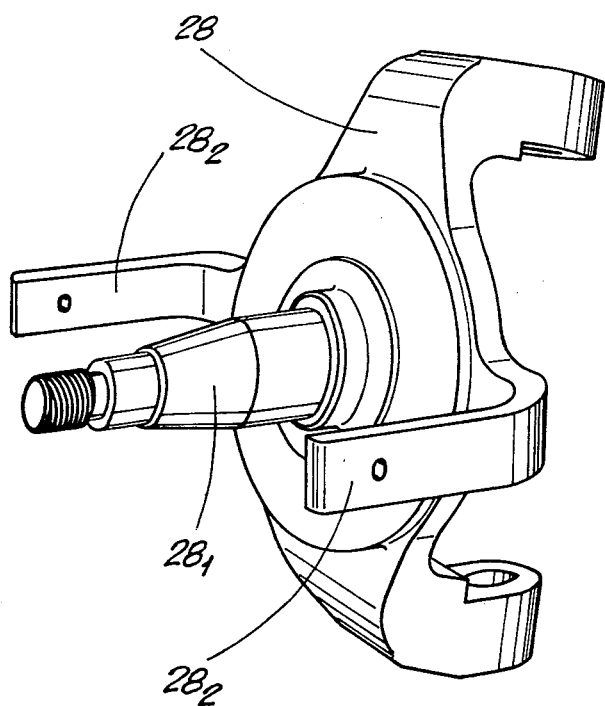
FIG. 5 is a perspective view of an embodiment of a steering knuckle with forged on brake supporting brackets.

The front wheel brake illustrated in FIG. 4 is similar to that of FIGS. 1–3 except that it does not have a hand brake (emergency brake) actuating means. Hub 29 is mounted on oblique roller bearings 26 and 27 about spindle $28_1$ of steering knuckle 28. An annular flange $29_1$ integral with hub 29 serves as a brake cover. The front wheel (not shown) is secured to the axle and brake assembly by bolts 30. Brake shoes 14 are disposed between housing 32 which is secured to the flange $29_1$ of hub 29 by studs 31. Brake shoes 14 may be made of stamped sheet metal or metal plates with pressed on brake linings for both the front and rear brakes. Brake shoes 14 are connected to ring cylinder 16 and ring piston 17 through insulation discs 15. As illustrated in perspective in FIG. 5, steering knuckle 28 is also designed as a support for the brake. Integral brackets $28_2$ are provided for this purpose. Only one bracket $28_2$ is shown in FIG. 4 for the sake of clarity. A yoke 10 is secured to brake shoes 14 as in the brake of FIGS. 1–3.

As shown in FIGS. 6 and 7, hub 44 and brake housing 44 are a single casing. Hub 44 is mounted about spindle $41_1$ of steering knuckle 41 on oblique roller bearings 42 and 43. The wheel side brake shoe cover 45 combines with housing $44_1$ to provide a brake drum which encloses a radially outwardly open cavity for brake shoes 51. Cover 45 is secured to hub 44 by lug bolts 47 and nuts 48 which secure the wheel cover 46 to hub 44 and by studs 49. Recesses $44_2$ are provided at the rear of clearances $45_1$ in the flange of the wheel side brake cover 45. When the wheel is revolving, air from the outside penetrates these orifices and enters the hub, cooling the revolving brake parts. Brake discs 50 and 51 are suspended from the brake holder arms $41_2$ and $41_3$ of the steering knuckle in axially movable but tangentially stationary manner. Brake linings $50_1$ and $51_1$ are provided on shoes 50 and 51. Projections $50_2$ on the periphery of disc 50 transmit the braking action to the brake holder arms $41_2$ and $41_3$. The brake holder arms also support the actuation unit consisting of ring cylinder 52 with ring piston 53, sealing of the unit occurring simultaneously by means of continuously adjusting sealing rings 54 and 55. The actuation unit is thermally insulated from the brake discs by means of insulating plates 56 and 57. The brake fluid for actuating the brake is supplied to the ring cylinder chamber via brake hose 58 and bore 59. A vent nipple $58_1$ is mounted on ring cylinder 52 near the brake hose. Once the wheel and the holding screws 49 have been removed, the wheel-side brake housing part 45 may be taken off in order to replace the worn parts. Thereupon the front brake disc 50 may be removed from brake holder arms $41_2$ and $41_3$, and, without removing the hose 58, the hydraulic unit also may be swung away from the brake holder arms. Access to the second brake disc 51 is thereby achieved, which may also be removed. If the friction linings are worn, a new disc 51 may be inserted first, ring piston 53 is pressed back into its initial position in ring cylinder 52 against the resistance of sealing rings 54 and 55, the actuation unit is pushed on the brake holder arms, and the second brake disc 50 is inserted. The wheel-side brake part 45 is then placed again on wheel bolts 47 and fastened to the hub by means of studs 49. Now the wheel may again be put into place.

FIGS. 8 and 9 illustrate another embodiment of a rear wheel brake for the same vehicle. The upper half of FIG. 8 illustrates an embodiment in which drive shaft 60 is provided with a flange $60_1$ which, by means of wheel lug bolts 63 and nuts 64, maintains both the axle-side brake housing part 61 and the wheel-side brake housing 62 in place. The lower part of FIG. 8 illustrates an embodiment wherein hub body 66 carries integral axle-side brake housing part $66_1$. Hub 66 is mounted on shaft 65 and is held in place by a crown nut 67. The design of the hydraulic actuation unit is the same as for the front wheel brakes. Hence, the individual parts need not be referenced again. However, the disc brakes 68 and 69, which are provided with the same brake linings as the front wheel brakes, are equipped peripherally with additional reinforcement members $68_1$ or $69_1$ between the brake holder extensions, a cam 70 being mounted between said reinforcements and fastened to ring cylinder 74 by means of a clamping plate 71 with studs 72 and 73. By means of a shaft extension $70_1$, cam 70 reaches through an aperture in holding plate 71 and is connected to a lever 75 through a square shaped tube $70_2$. Lever 75 is secured by means of a nut 76 to the mechanical cable of the hand brake. When actuating the hand lever, cam 70 is made to rotate and brake discs 68 and 69 are locally pressed against the revolving brake housing 61, 62 and $66_1$, 62, respectively. Brake discs 68 and 69, and also the actuation unit, are supported on the arms $77_1$ of the brake support 77 bolted to the rear axle 78. Changing of brake discs is performed in the same manner as for the front wheels. Only screws 72 and 73 must be removed additionally and withdrawn from cam 70. After the brake discs have been newly lined, the mechanical actuation may be bolted on again. FIG. 10 is a partial section of the cam actuation.

Although the invention has been described in detail for the purposes of illustration, it is to be understood that such detail is solely for that purpose and that variations can be made therein by those skilled in the art without departing from the spirit and scope of the invention except as it may be limited by the claims.

I claim:

1. In a brake assembly for a vehicle wheel comprising a brake housing rotatable with the wheel and having separate wheel side and second annular members axially spaced from each other to form a channel-like gap which is open at its radially exterior side, said annular members having facing internal sides which provide braking surfaces, braking discs having friction linings disposed in the gap and facing the braking surfaces, and means for hydraulically actuating the braking discs disposed in the gap between the braking discs, the improvement which comprises a. support means for the braking discs and actuating means fixed against rotation with the wheel having at least one pair of diametrically opposite arms which extend over the open side of the gap and support the braking discs and actuating means in the gap, said arms supporting the braking discs against circumferential movement but permitting free axial movement thereof and supporting the brake actuating means freely in the gap without transmission of torque thereby;

b. said means for hydraulically actuating the braking discs being mounted on the said arms between the braking discs and comprising annular members which are axially movable relative to each other under fluid pressure to press the braking discs against the braking surfaces, said annular members being disposed where they contact the braking discs at the radial centers thereof;

c. means for securing the said second annular member for rotation with the wheel; and d. means for securing the wheel side annular member to the second annular member whereby upon removal of the wheel and said wheel side member, the braking discs may be removed without dismantling the actuation unit.

2. The brake assembly of claim 1 wherein said wheel side member is secured to a hub adapted to be journaled on the spindle of a steering knuckle.

3. The hydraulically actuated fully lined disc brake of claim 1 characterized in that one of the brake shoes is adapted to be attached to a parking brake.

4. The hydraulically actuated fully lined disc brake of claim 1 characterized in that a yoke connected with an actuation rod system is supported on the brake support, one of said annular members being a ring cylinder and said yoke acting on both sides on the ring cylinder and therefore on the brake disc of one brake.

5. The hydraulically actuated fully lined disc brake of claim 1 characterized in that a cam is rotatably mounted between the braking disc at the outer periphery of the hydraulic actuation unit.

6. The brake assembly of claim 1 wherein the wheel side annular member of the housing is connected to said second annular member by wheel studs and circumferentially spaced retaining bolts whereby the wheel side member can be removed by taking off the wheel and loosening the retaining bolts.

7. The brake assembly of claim 1 wherein the braking discs are semi-circular and have radial extensions which bear on the said arms and are surrounded by a yoke secured to the brake-support arms.

8. The brake assembly of claim 1 wherein the hydraulic actuating means is a ring cylinder and ring piston or two differential pistons and the means for securing the wheel side annular member to the second annular member are circumferentially spaced retaining bolts and said wheel side annular member may be removed following wheel removal and loosening of the retaining bolts for replacing the discs without dismantling the actuating means.

9. A hydraulically actuated fully lined disc brake comprising a brake housing having a wheel side member and an axle side member spaced to provide a channel-like gap which is open on its radially exterior side, said annular members having internal surfaces to be contacted by brake disc linings for braking the wheel, braking discs in the gap having friction linings facing the said internal surfaces of the annular members, a brake bracket having arms which extend across the gap and support the braking discs in the gap against circumferential movement but permit the discs to move axially, said arms absorbing torque, a brake disc actuating means disposed in the gap between the brake discs and supported freely in the gap by the arms of the brake bracket without transmission of torque thereby said actuating means being axially movable and comprising a hydraulically actuated ring cylinder and ring piston or two differential pistons, the hydraulically caused forces of the actuating means being active at the efficient radius of the friction linings, said wheel side member being removable from the axle side member without dismantling the actuation unit to change the braking discs after the wheel has been removed.

10. The assembly of claim 9 wherein said cylinder is supported in the space by a means attached to a stationary member of the assembly, and said piston moves in response to fluid pressure against one brake disc and the cylinder simultaneously moves against the other braked disc.

11. The brake assembly of claim 9 further comprising means for replacing worn brake discs without dismantling the actuation unit wherein the brake discs are disposed on stationary brake holder arms by means of radial projections therein, and said discs are surrounded by detachable clevises connected to the brake holder arms.

12. A hydraulically actuated fully lined disc brake assembly for braking a wheel of a motor vehicle comprising a brake housing having opposite radially extending annular members spaced axially apart to provide an annular gap therebetween which is open on its radial exterior side, said members having inner surfaces which act as braking surfaces, and means for securing said housing to the wheel so the housing is supported solely by the wheel, a brake support bracket fixed against rotation with the wheel and comprising an arm which is removably attached thereto and extends axially over the said gap, brake discs having friction linings facing the said braking surfaces, means carried by the brake discs which secure the brake discs to the said arm when the arm is disposed over the gap to fix the brake discs against rotation with the wheel but permit movement of the brake discs axially, a means disposed between the brake discs for hydraulically actuating the brake discs to move them against the said braking surfaces comprising a ring cylinder member having a surface facing a first brake disc and an axially extending bore open at its opposite surface, a ring piston slidably disposed in the bore with one end facing the second brake discs, means for sealing the interfaces between the ring piston and walls of the bore against loss of fluid under pressure, and means to introduce fluid under pressure into the ring cylinder to move the ring piston in the bore and to press the piston against the radial center of said second brake disc and said facing surface of the ring cylinder against the radical center of said first brake disc and thereby press the friction linings against the braking surfaces, whereby the brake discs are activated at their most efficient radii, said brake housing being removable from the assembly after removing the arm from over the gap and removing the wheel, whereby the brake discs can be replaced without dismantling the means for hydraulically actuating the brake discs, said brake support bracket supporting the means for actuating the brake discs freely in the gap without transmission of torque thereby.

13. A hydraulically actuated brake assembly of claim 12 wherein a first ring annular member is disposed between the ring piston and facing brake disc and a second annular member is disposed between the ring cylinder and the facing brake disc, said annular members having radial widths which are smaller than the radial widths of the brake discs.

* * * * *